US010140954B2

(12) United States Patent
Zhao

(10) Patent No.: US 10,140,954 B2
(45) Date of Patent: Nov. 27, 2018

(54) METHOD FOR DETERMINING RESIDUAL IMAGE LEVEL OF DISPLAY DEVICE AND DETECTION DEVICE

(71) Applicants: BOE Technology Group Co., Ltd., Beijing (CN); Hefei Xinsheng Optoelectronics Technology Co., Ltd., Hefei (CN)

(72) Inventor: Jian Zhao, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 117 days.

(21) Appl. No.: 15/305,492

(22) PCT Filed: Mar. 13, 2015

(86) PCT No.: PCT/CN2015/074247
§ 371 (c)(1),
(2) Date: Oct. 20, 2016

(87) PCT Pub. No.: WO2016/065792
PCT Pub. Date: May 6, 2016

(65) Prior Publication Data

US 2017/0047047 A1 Feb. 16, 2017

(30) Foreign Application Priority Data

Oct. 28, 2014 (CN) .......................... 2014 1 0589758

(51) Int. Cl.
*G06T 1/00* (2006.01)
*G09G 5/10* (2006.01)
(Continued)

(52) U.S. Cl.
CPC ............... *G09G 5/10* (2013.01); *G09G 3/006* (2013.01); *G09G 3/36* (2013.01);
(Continued)

(58) Field of Classification Search
None
See application file for complete search history.

(56) References Cited

U.S. PATENT DOCUMENTS 6,606,116 B1 8/2003 Poynter

FOREIGN PATENT DOCUMENTS

CN 101075423 A 11/2007
CN 101425246 A 5/2009
(Continued)

OTHER PUBLICATIONS

Jul. 31, 2015—(WO)—International Search Report and Written Opinion Appn PCT/CN2015/074247 with English Tran.
(Continued)

*Primary Examiner* — Andrew G Yang
(74) *Attorney, Agent, or Firm* — Banner & Witcoff, Ltd.

(57) ABSTRACT

A method for determining a residual image level of a display device and a detection device. The method includes: lighting the display device based on a setting image type, and setting a plurality of detection positions on the display device based on the setting image type; converting a display image on the display device into a grayscale image with a setting level; detecting an actual brightness value of each detection position within a setting time after converting into a grayscale of the setting level; for each detection position, acquiring a brightness variation index of the detection position based on the acquired actual brightness value and a corresponding predetermined relationship between the actual brightness value and a theoretical brightness value of the grayscale of the setting level; and acquiring an residual image level of the
(Continued)

display device in the grayscale of the setting level based on the acquired brightness variation index.

12 Claims, 2 Drawing Sheets

(51) Int. Cl.
*G09G 3/00* (2006.01)
*G09G 3/36* (2006.01)

(52) U.S. Cl.
CPC .............. *G09G 2320/0233* (2013.01); *G09G 2320/0257* (2013.01); *G09G 2320/043* (2013.01); *G09G 2320/0646* (2013.01); *G09G 2320/0693* (2013.01); *G09G 2360/147* (2013.01)

(56) References Cited

FOREIGN PATENT DOCUMENTS

| | | | |
|---|---|---|---|
| CN | 101655409 | A | 2/2010 |
| CN | 102736282 | A | 10/2012 |
| CN | 102855842 | A | 1/2013 |
| CN | 103050074 | A | 4/2013 |
| CN | 103165057 | A | 6/2013 |
| CN | 104282251 | A | 1/2015 |
| WO | 2010056272 | A | 5/2010 |

OTHER PUBLICATIONS

Mar. 28, 2016—(CN)—First Office Action Appn 201410589758.3 with English Tran.
Sep. 30, 2016—(CN)—Second Office Action Appn 201410589758.3 with English Tran.

METHOD FOR DETERMINING RESIDUAL IMAGE LEVEL OF DISPLAY DEVICE AND DETECTION DEVICE

The application is a U.S. National Phase Entry of International Application No. PCT/CN2015/074247 filed on Mar. 13, 2015, designating the United States of America and claiming priority to Chinese Patent Application No. 201410589758.3, which was filed on Oct. 28, 2014. The present application claims priority to and the benefit of the above-identified applications and the above-identified applications are incorporated by reference herein in their entirety.

TECHNICAL FIELD

Embodiments of the present disclosure relate to a method and a detection device for determining a residual image level of a display device.

BACKGROUND

A residual image phenomenon on a display device mainly refers to that: when the display device is switched to display another image after displaying a same image for a long time, the display device may impose a residual image of the previous image on the new image. As for a liquid crystal display (LCD), the main reasons that cause residual images are as follows. Generally, as the absolute values of positive and negative voltage values of a common voltage applied to common electrodes of the LCD during polarity inversion cannot be exactly the same, movable ionic impurities in liquid crystal molecules are migrated and gathered to one electrode under the action of asymmetrical voltages during polarity inversion. Then, the ionic impurities can still produce internal electric field to rotate the liquid crystal molecules even after the driving voltage disappears, and hence residual images can be formed. Currently, a conventional residual image level determining method is to determine the residual image level of a sample image by visual observation by human eyes. This residual image level determining method has high subjective casualness and low accuracy, does not have a uniform standard for residual image level determination, provides different residual image level determining results by different people, and therefore cannot obtain objective results and may obstruct improvement of subsequent processes.

SUMMARY

At least one embodiment of the present disclosure provides a method and a detection device for residual image level determination on a display device, which are used for improving the detection accuracy of residual image display of the display device.

At least one embodiment of the disclosure provides a residual image level determining method of a display device, comprising: lighting the display device based on a setting image type, and setting a plurality of detection positions on the display device based on the setting image type; converting a display image on the display device into a grayscale image with a setting level; detecting an actual brightness value of each detection position within a setting time after converting into a grayscale of the setting level; for each detection position, acquiring a brightness variation index of the detection position based on the acquired actual brightness value and a corresponding predetermined relationship between the actual brightness value and a theoretical brightness value of the grayscale of the setting level; and acquiring a residual image level of the display device in the grayscale of the setting level based on the acquired brightness variation index and a corresponding predetermined relationship between brightness variation indexes and residual image levels.

In the above embodiment, the brightness of the display device during image conversion can be accurately acquired through a shooting device, and the residual image level is calculated based on the brightness. Thus, the residual image detection of the display device can be achieved conveniently, and meanwhile, the accuracy of residual image detection can be improved.

For example, acquiring the brightness variation index of the detection position based on the acquired actual brightness value and the corresponding predetermined relationship between the actual brightness value and the theoretical brightness value of the grayscale of the setting level includes: the brightness variation index is equal to a ratio of an absolute value of a difference between the actual brightness value and the theoretical brightness value to the theoretical brightness value.

For example, acquiring the residual image level of the display device in the grayscale of the setting level based on the acquired brightness variation index and the corresponding predetermined relationship between the brightness variation indexes and the residual image levels includes: lighting the display device and acquiring a brightness uniform value of the display device; determining whether a sum of the brightness variation index and the brightness uniform value is greater than 1, and determining there is residual image occurrence at the detection position when the sum is greater than 1; acquiring a residual image index based on the brightness variation index of the detection position and a corresponding predetermined relationship between the brightness variation index and the residual image index when determining there is residual image occurrence at the detection position; and acquiring a maximum residual image index, and acquiring the residual image level of the display device in the grayscale of the setting level based on the acquired maximum residual image index and a corresponding predetermined relationship between the residual image indexes and the residual image levels.

For example, acquiring the residual image index based on the brightness variation index of the detection position and the corresponding predetermined relationship between the brightness variation index and the residual image index includes: the residual image index is an integral multiple of the brightness variation index.

For example, the residual image level determining method of the display device further comprises: adjusting the grayscale level of the display device until the sum of the brightness variation index and the brightness uniform value of each detected detection position is less than 1, and acquiring the grayscale level of the display device at this point, where the grayscale level at this point is a disappearing grayscale of the residual image.

For example, the theoretical brightness value in the grayscale of the setting level is acquired by: lighting the display device based on grayscales of a plurality of levels, acquiring brightness values corresponding to a grayscale of each level, obtaining a Gamma curve between grayscale levels and corresponding brightness values by calculation based on the acquired grayscale of each level and a corresponding brightness value, and acquiring the theoretical brightness value corresponding to the grayscale of the setting level based on the acquired Gamma curve.

For example, the setting image type is a checkerboard image type with alternating black and white; when the detected residual image is a line residual image, the detection positions includes border lines of each grid of the checkerboard; and when the detected residual image is a surface residual image, the detection positions includes a center position of each grid of the checkerboard.

For example, the checkerboard image type with alternating black and white is a 7*5 checkerboard image type with alternating black and white.

At least one embodiment of the disclosure also provides a detection device for residual image level determination of a display device, comprising a signal generator, a shooting device and a control unit communicatively coupled to the signal generator and the shooting device. The signal generator is configured to generate a signal for controlling the display device to display different images based on a control signal from the control unit; the shooting device is configured to acquire brightness values of the display device when displaying different images, and send the acquired brightness values to the control unit; and the control unit is configured to acquire an actual brightness value in a grayscale of a setting level among the brightness values of the display device acquired by the shooting device, and determine an residual image level of the display device based on a corresponding relationship between the actual brightness value and a theoretical brightness value in the grayscale of the setting level.

For example, the shooting device is a camera.

For example, the detection device further comprises a 3D movable support platform, where the detection device or the display device is disposed on the 3D movable support platform. A relative movement between the shooting device and the display device can be achieved through the 3D movable support platform.

BRIEF DESCRIPTION OF THE DRAWINGS

In order to illustrate the technical solutions in the embodiments of the present disclosure, the drawings used in the description of the embodiments will be briefly described in the following; it is obvious that the drawings described below are only related to some embodiments of the present disclosure and are not intended to be limitative in the disclosure.

REFERENCE NUMERALS OF THE ACCOMPANYING DRAWINGS

10—control unit 20—signal generator 30—display device 40—shooting device 50—three-dimensional (3D) movable support platform

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

In order to improve the detection accuracy of residual image display of the display device, at least one embodiment of the present disclosure provides a method and a detection device for residual image level determination on a display device. In the technical solutions provided in the embodiments of the present disclosure, whether a brightness is a residual image brightness is determined based on the corresponding relationship between the theoretical brightness and the actual brightness of detection positions in the display device during the conversion of the display device, and the residual image level is determined based on the relationship between the residual image brightness and a corresponding residual image level. Thus, the accuracy of residual image detection can be improved.

Figure 1:
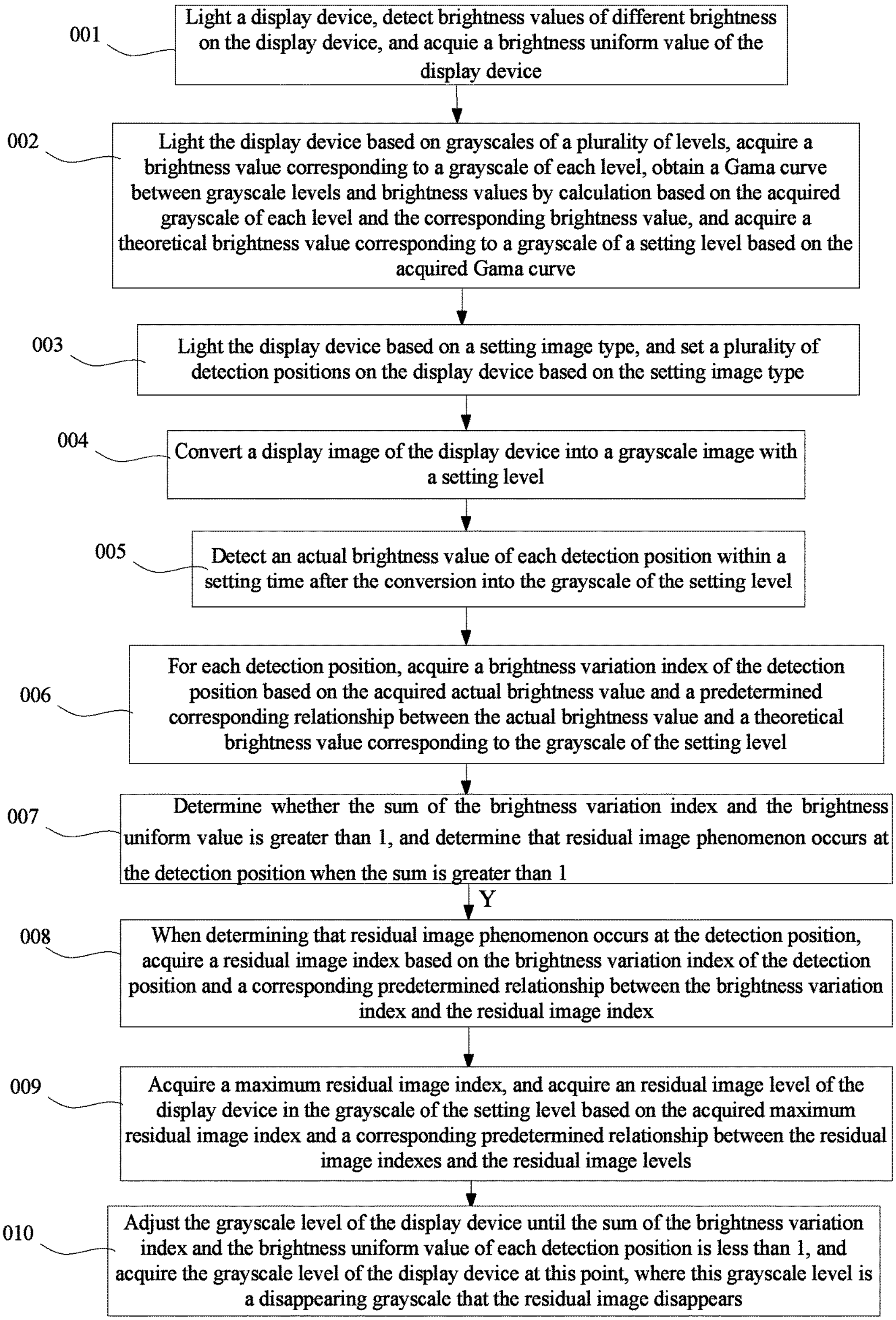
FIG. 1 is a method for residual image level determination on a display device provided by an embodiment of the present disclosure.

As illustrated in FIG. 1, FIG. 1 illustrates a method for residual image level determination provided by an embodiment of the present disclosure.

At least one embodiment of the present disclosure provides a method for residual image level determination on a display device. The method comprises the following steps:

lighting (powering up) the display device based on a setting image type, and setting (selecting) a plurality of detection positions on the display device based on the setting image type;

converting a display image on the display device into a grayscale image with a setting level;

detecting an actual brightness value of each detection position within a setting time after converting into a grayscale of the setting level;

for each detection position, acquiring a brightness variation index of the detection position based on the acquired actual brightness value and a corresponding predetermined relationship between the actual brightness value and a theoretical brightness value of the grayscale of the setting level; and acquiring a residual image level of the display device in the grayscale of the setting level based on the acquired brightness variation index and a corresponding predetermined relationship between brightness variation indexes and residual image levels.

In the embodiment, the brightness of the display device during image conversion can be accurately acquired through a shooting device, and the residual image level is calculated based on the brightness. Thus, the residual image detection of the display device can be achieved, and meanwhile, the accuracy of residual image detection can be improved.

Description will be given below to the embodiments for the convenient understanding of the method. The residual image level includes a line residual image level and a surface residual image level. The setting image type is a checkerboard image type with alternating black and white. When the detected residual image is a line residual image, the detection positions include border lines of each grid on the checkerboard. When the detected residual image is a surface residual image, the detection positions include a center position of each grid on the checkerboard. For instance, the checkerboard image type with alternating black and white displayed by the display device is a 7*5 checkerboard image type with alternating black and white.

In one example, by taking the detection of a line residual image level as an example, the detection method comprises the following steps:

Step 001: lighting the display device, detecting brightness values of different brightness on the display device, and acquiring a brightness uniform value of the display device.

For instance, brightness values on different positions are detected; a detected minimum brightness value is compared with a detected maximum brightness value; and a ratio between the minimum brightness value and the maximum brightness value is taken as the brightness uniform value.

Step 002: lighting the display device based on grayscales of a plurality of levels, acquiring a brightness value corresponding to a grayscale of each level, obtaining a Gamma curve between grayscale levels and brightness values by calculation based on the acquired grayscale of each level and the corresponding brightness value, and acquiring a theoretical brightness value corresponding to a grayscale of a setting level based on the acquired Gamma curve.

For instance, signals of different grayscales are inputted into the display device via a signal generator, and brightness of an image corresponding to the grayscale is captured by a shooting device, so that a corresponding numerical set between the brightness values and the grayscales can be formed. The Gamma curve is formed based on the numerical set, and hence the brightness value corresponding to each grayscale can be found.

Step 003: lighting the display device based on a setting image type, and setting a plurality of detection positions on the display device based on the setting image type.

For instance, the setting image type is a checkerboard image type with alternating black and white and is, for example, a 7*5 checkerboard image type with alternating black and white. The detection positions configured at this point include positions of border lines of each grid of the checkerboard. The brightness uniform value of the entire display device at this point is calculated based on the brightness value of each detection position and provides a reference number for subsequent level determining.

Step 004: converting a display image of the display device into a grayscale image with a setting level.

The specific grayscale with the setting level may be manually configured. For example, different grayscales such as 127 grayscales or 225 grayscales can be configured.

Step 005: detecting an actual brightness value of each detection position within a setting time after the conversion into the grayscale of the setting level.

For instance, a shooting device is adopted for detection, where one of the shooting device and the display device is disposed on a 3D movable support platform, so that the shooting device and the display device can move relative to each other. For instance, the 3D movable support platform is used for supporting the shooting device. During detection, the shooting device is adopted to scan each detection position and acquire the actual brightness value of each detection position within the setting time after image conversion.

Step 006: for each detection position, acquiring a brightness variation index of the detection position based on the acquired actual brightness value and a predetermined corresponding relationship between the actual brightness value and a theoretical brightness value corresponding to the grayscale of the setting level.

For instance, the brightness variation index is equal to a ratio of an absolute value of the difference between the actual brightness value and the theoretical brightness value to the theoretical brightness value. Take one detection position as an example. For this detection position, the shooting device acquires the actual brightness value of the detection position when the setting display image is changed to the setting grayscale, and acquires the theoretical brightness value of the detection position in the setting grayscale based on the acquired Gamma curve. The theoretical brightness value is subtracted from the actual brightness value to obtain a difference value, and the ratio of the absolute value of the difference value to the theoretical brightness value is taken as the brightness variation index. For instance, the brightness variation index is:

$$S = \frac{|L - La|}{La},$$

where S refers to the brightness variation index; L refers to the actual brightness value of the detection position within the setting time after the conversion into the grayscale image with the setting level; and La refers to the theoretical brightness value of the detection position in the grayscale of the setting level.

Step 007: determining whether the sum of the brightness variation index and the brightness uniform value is greater than 1, and determining that residual image phenomenon occurs at the detection position when the sum is greater than 1.

Step 008: when determining that residual image phenomenon occurs at the detection position, acquiring a residual image index based on the brightness variation index of the detection position and a corresponding predetermined relationship between the brightness variation index and the residual image index.

The corresponding predetermined relationship between the brightness variation index and the residual image index includes that: the residual image index is an integral multiple of the brightness variation index; that is, Z=n*S, where Z is the residual image index, n is a positive integer, and S is the brightness variation index.

Step 009: acquiring a maximum residual image index, and acquiring a residual image level of the display device in the grayscale of the setting level based on the acquired maximum residual image index and a corresponding predetermined relationship between the residual image indexes and the residual image levels.

For instance, the residual image indexes of all the detection positions are compared to acquire the maximum residual image index, and the residual image level of the display device in the grayscale of the setting level is acquired based on the corresponding predetermined relationship between the maximum residual image index and the residual image level.

Step 010: adjusting the grayscale level of the display device until the sum of the brightness variation index and the brightness uniform value of each detection position is less than 1, and acquiring the grayscale level of the display device at this point. This grayscale level is a disappearing grayscale that the residual image disappears.

For instance, when the residual image level of the display device in a grayscale of a setting level is detected, the level of the grayscale being converted to is adjusted until there is no residual image at each detected detection position. At this point, the grayscale of this level is a disappearing grayscale. For instance, when the setting grayscale level is 127, the residual image of the display device is detected, and then, the setting grayscale is adjusted between the grayscale levels 127-225 until the disappearing grayscale is obtained.

A detection method for surface residual image is the same as the above line residual image detection method. The only difference is a different setting for the detection positions.

During the detection of surface residual images, a detection position provided with the surface residual image is in the center of each grid of the checkerboard. Besides that, the detection method is similar to the above-illustrated line residual image detection method. Therefore, no further description will be given here.

Figure 2:
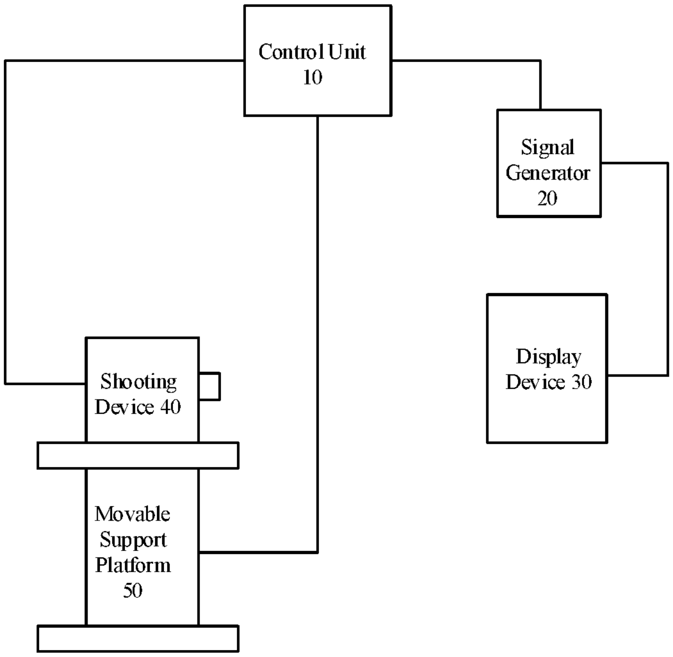
FIG. 2 is a front view of a detection device for residual image level determination on a display device provided by an embodiment of the present disclosure.

As illustrated in FIG. 2, at least one embodiment of the present disclosure further provides a residual image detection device of a display device 30, which comprises a signal generator 20, a shooting device 40 and a control unit 10 communicatively coupled to the signal generator 20 and the shooting device 40.

The signal generator 20 is configured to generate signals for controlling the display device 30 to display different images based on control signals from the control unit 10; the shooting device 40 is configured to acquire the brightness values of the display device 30 when displaying different images, and send the acquired brightness values to the control unit 10; and the control unit 10 is configured to acquire the actual brightness values in the grayscale of the setting level among the brightness values of the display device 30 acquired by the shooting device 40, and determine the residual image level of the display device 30 based on the corresponding predetermined relationship between the actual brightness value and the theoretical brightness value corresponding to the setting grayscale.

In the above embodiment, the control unit 10 is adopted to control the signal generator 20 to input signals to the display device 30 for controlling the display of different images, so that images displayed by the display device 30 can be converted, and hence the residual image phenomenon occurring on the display device 30 can be detected within the setting time after image conversion. The specific working principle is as follows.

The control unit 10 controls the signal generator 20 to send signals to the display device 30 for displaying images in different grayscale levels, and meanwhile, the shooting device 40 acquires the brightness values of the display device 30 in different grayscales. Thus, a corresponding Gamma curve between the grayscales and the display brightness values are obtained. A theoretical brightness value corresponding to each grayscale may be obtained through the Gamma curve. Moreover, the shooting device 40 acquires the brightness values of the detection positions and feeds back the brightness values to the control unit 10, and the control unit 10 calculates the brightness uniform value based on the detected brightness values of all the detection positions.

The control unit 10 controls the signal generator 20 to send a signal to the display device 30 for displaying a setting image type. The display device 30 displays a setting image, and a plurality of detection positions are set on the display device 30 based on the displayed image type. For instance, the image type is a black-and-white image of an international checkerboard. The detection positions are set based on different types of detected residual images. For instance, in the process of detecting line residual images, the detection positions include border lines of black or white grids of the checkerboard. In the process of detecting surface residual images, the detection positions include a center position of each grid of the checkerboard.

The control unit 10 controls the signal generator 20 to send a signal to the display device 30 for converting into the grayscale of the setting level, and an image displayed by the display device 30 is converted into the setting grayscale. After conversion, the shooting device 40 is adopted to scan all the detection positions of the display device 30. For instance, the shooting device 40 is a camera. The camera is adopted to acquire the brightness of the display device 30. Moreover, the shooting device 40 and the display device 30 may move relative to each other. For instance, the shooting device 40 or the display device 30 is disposed on a 3D movable support platform 50, so that the relative movement between both can be achieved. For instance, the control unit 10 is communicatively coupled to the 3D movable support platform 50 to control the motion of the 3D movable support platform 50. In the scanning process, the shooting device 40 scans all the detection positions within the setting time.

For each detection position, the shooting device 40 feeds back the acquired actual brightness value to the control unit 10. The control unit 10 acquires the difference value between the actual brightness value and the theoretical brightness value (acquired through the Gamma curve) of the detection position in the grayscale of the setting level, and acquires the brightness variation index of the detection position based on the ratio of the absolute value of the difference value to the theoretical brightness value. The control unit 10 determines whether there is residual image occurrence at the detection position based on the corresponding relationship between the brightness variation index and the brightness uniform value. Specifically, the control unit 10 determines whether the sum of the brightness variation index and the brightness uniform value is greater than 1, and determines there is residual image occurrence at the detection position when the sum is greater than 1. When there is residual image occurrence at the detection position, the control unit 10 acquires the residual image index of the detection position based on the brightness variation index and the corresponding predetermined relationship between the brightness variation index and the residual image index. The residual image index is an integral multiple of the brightness variation index.

After acquiring the residual image indexes of all the detection positions, the control unit 10 acquires the residual image level of the display device 30 in the grayscale of the setting level based on the detected maximum residual image index and the corresponding relationship between line residual image indexes and the line residual image levels.

Meanwhile, the control unit 10 may control the grayscale of the setting level to be grayscales of different levels, and hence acquire the residual image levels of the display device 30 in the grayscales of different levels.

In addition, after detecting the residual image level of the display device 30, the control unit 10 may gradually change the setting level for the grayscale by the above method until the residual image of the display device 30 disappears, and acquire the disappearing grayscale of the display device 30.

It can be seen from above that the detection device provided by the embodiments can rapidly and accurately acquire the residual image level of the display device 30 and improve the efficiency and the accuracy of the detection of the residual image level of the display device 30.

The foregoing are merely specific embodiments of the disclosure, but not limitative to the protection scope of the disclosure. The protection scope of the disclosure shall be defined by the accompanying claims.

The present disclosure claims the benefits of Chinese patent application No. 201410589758.3, which was filed on Oct. 28, 2014 and is incorporated herein in its entirety by reference as part of this application.

What is claimed is:

1. A residual image level determining method of a display device, comprising:

lighting the display device based on a setting image type, and setting a plurality of detection positions on the display device based on the setting image type;

converting a display image on the display device into a grayscale image with a grayscale of a setting level;

detecting an actual brightness value of each detection position within a setting time after converting the display image into the grayscale image with the grayscale of the setting level;

for each detection position, acquiring a brightness variation index of the detection position based on the detected actual brightness value and a corresponding predetermined relationship between the actual brightness value and a theoretical brightness value of the grayscale of the setting level; and acquiring a residual image level of the display device in the grayscale of the setting level based on the acquired brightness variation index and a corresponding predetermined relationship between brightness variation indexes and residual image levels, wherein the theoretical brightness value in the grayscale of the setting level is acquired by:

lighting the display device based on grayscales of a plurality of levels, acquiring brightness values corresponding to a grayscale of each level, obtaining a Gamma curve between grayscale levels and corresponding brightness values by calculation based on the acquired grayscale of each level and a corresponding brightness value, and acquiring the theoretical brightness value corresponding to the grayscale of the setting level based on the obtained Gamma curve.

2. The residual image level determining method of the display device according to claim 1, wherein the acquiring the brightness variation index of the detection position based on the detected actual brightness value and the corresponding predetermined relationship between the actual brightness value and the theoretical brightness value of the grayscale of the setting level includes: determining that the brightness variation index is equal to a ratio of an absolute value of a difference between the actual brightness value and the theoretical brightness value to the theoretical brightness value.

3. The residual image level determining method of the display device according to claim 2, wherein the acquiring the residual image level of the display device in the grayscale of the setting level based on the acquired brightness variation index and the corresponding predetermined relationship between the brightness variation indexes and the residual image levels includes:

lighting the display device and acquiring a brightness uniform value of the display device;

determining whether a sum of the brightness variation index and the brightness uniform value is greater than 1, and determining there is residual image occurrence at the detection position when the sum is greater than 1;

acquiring a residual image index based on the brightness variation index of the detection position and a corresponding predetermined relationship between the brightness variation index and the residual image index when determining there is residual image occurrence at the detection position; and acquiring a maximum residual image index, and acquiring the residual image level of the display device in the grayscale of the setting level based on the acquired maximum residual image index and a corresponding predetermined relationship between the residual image indexes and the residual image levels.

4. The residual image level determining method of the display device according to claim 3, wherein the acquiring the residual image index based on the brightness variation index of the detection position and the corresponding predetermined relationship between the brightness variation index and the residual image index includes: determining that the residual image index is an integral multiple of the brightness variation index.

5. The residual image level determining method of the display device according to claim 3, further comprising:

adjusting the grayscale level of the display device until the sum of the brightness variation index and the brightness uniform value of each detected detection position is less than 1, and acquiring the grayscale level of the display device at this point, where the grayscale level at this point is a disappearing grayscale of the residual image.

6. The residual image level determining method of the display device according to claim 3, wherein the setting image type is a checkerboard image type with alternating black and white; when the acquired residual image is a line residual image, the detection positions includes border lines of each grid of the checkerboard; and when the acquired residual image is a surface residual image, the detection positions includes a center position of each grid of the checkerboard.

7. The residual image level determining method of the display device according to claim 1, wherein the setting image type is a checkerboard image type with alternating black and white; when the acquired residual image is a line residual image, the detection positions includes border lines of each grid of the checkerboard; and when the acquired residual image is a surface residual image, the detection positions includes a center position of each grid of the checkerboard.

8. The residual image level determining method of the display device according to claim 2, wherein the setting image type is a checkerboard image type with alternating black and white; when the acquired residual image is a line residual image, the detection positions includes border lines of each grid of the checkerboard; and when the acquired residual image is a surface residual image, the detection positions includes a center position of each grid of the checkerboard.

9. A detection device for residual image level determination of a display device, comprising a signal generator, a shooting device and a control unit communicatively coupled to the signal generator and the shooting device, wherein:

the signal generator is configured to generate a signal for controlling the display device to display different images based on a control signal from the control unit;

the shooting device is configured to acquire brightness values of the display device when displaying different images, and send the acquired brightness values to the control unit; and the control unit is configured to acquire an actual brightness value in a grayscale of a setting level among the brightness values of the display device acquired by the shooting device, and determine a residual image level of the display device based on a corresponding relationship between the actual brightness value and a theoretical brightness value in the grayscale of the setting level, wherein the control unit is configured to acquire the theoretical brightness value in the grayscale of the setting level by;

lighting the display device based on grayscales of a plurality of levels, acquiring brightness values corresponding to a grayscale of each level, obtaining a Gamma curve between grayscale levels and corresponding brightness values by calculation based on the acquired grayscale of each level and a corresponding brightness value, and acquiring the theoretical brightness value corresponding to the grayscale of the setting level based on the obtained Gamma curve.

10. The detection device according to claim 9, wherein the shooting device is a camera.

11. The detection device according to claim 10, further comprising a 3D movable support platform, wherein the detection device or the display device is disposed on the 3D movable support platform.

12. The detection device according to claim 9, further comprising a 3D movable support platform, wherein the detection device or the display device is disposed on the 3D movable support platform.

* * * * *